(12) United States Patent
Santra et al.

(10) Patent No.: US 12,286,499 B2
(45) Date of Patent: Apr. 29, 2025

(54) POLYROTAXANE-REINFORCED SETTABLE FLUIDS WITH ENTRAPPED GAS PHASE UNDER HIGH PRESSURE

(71) Applicant: Saudi Arabian Oil Company, Dhahran (SA)

(72) Inventors: Ashok Santra, The Woodlands, TX (US); Hasmukh A. Patel, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 145 days.

(21) Appl. No.: 17/196,273

(22) Filed: Mar. 9, 2021

(65) Prior Publication Data

US 2022/0289887 A1    Sep. 15, 2022

(51) Int. Cl.
| | |
|---|---|
| *C08F 283/06* | (2006.01) |
| *C04B 24/24* | (2006.01) |
| *C04B 24/32* | (2006.01) |
| *C04B 24/42* | (2006.01) |
| *C04B 111/00* | (2006.01) |
| *C04B 111/34* | (2006.01) |
| *C08K 3/22* | (2006.01) |
| *C08K 3/36* | (2006.01) |
| *C08K 5/23* | (2006.01) |
| *E21B 41/00* | (2006.01) |

(52) U.S. Cl.
CPC .............. *C08F 283/06* (2013.01); *C08K 3/22* (2013.01); *C08K 3/36* (2013.01); *C08K 5/23* (2013.01); *C04B 24/24* (2013.01); *C04B 24/32* (2013.01); *C04B 24/42* (2013.01); *C04B 2111/00232* (2013.01); *C04B 2111/34* (2013.01); *C08K 2003/2206* (2013.01); *C08K 2003/2227* (2013.01); *C08K 2003/2265* (2013.01); *E21B 41/00* (2013.01)

(58) Field of Classification Search
CPC ...................................... C04B 24/24
See application file for complete search history.

(56) References Cited

U.S. PATENT DOCUMENTS

| | | |
|---|---|---|
| 1,811,799 A | 6/1931 | Lukens |
| 3,301,797 A | 1/1967 | Drucket et al. |
| 3,481,903 A | 12/1969 | Alelio |
| 3,938,594 A | 2/1976 | Rhudy et al. |
| 4,137,182 A | 1/1979 | Golinkin |
| 4,272,430 A | 6/1981 | Pieh et al. |
| 4,615,809 A | 10/1986 | King |
| 4,771,112 A | 9/1988 | Engelbrecht |
| 4,797,433 A | 1/1989 | Lahalih |
| 5,007,481 A | 4/1991 | Williams et al. |
| 5,352,290 A | 10/1994 | Takeshita et al. |
| 5,401,312 A | 3/1995 | Hanst |
| 5,645,637 A | 7/1997 | Yaniv |
| 5,891,983 A | 4/1999 | Albrecht |
| 6,664,215 B1 | 12/2003 | Tomlinson |
| 6,668,927 B1 | 12/2003 | Chatterji et al. |
| 6,828,378 B2 | 12/2004 | Okumura et al. |
| 7,497,258 B2 | 3/2009 | Savery et al. |
| 7,527,098 B2 | 5/2009 | Santra et al. |
| 7,612,142 B2 | 11/2009 | Ito et al. |
| 7,622,527 B2 | 11/2009 | Ito et al. |
| 7,637,319 B2 | 12/2009 | Savery et al. |
| 7,654,326 B1 | 2/2010 | Santra et al. |
| 7,799,867 B2 | 9/2010 | Ito et al. |
| 7,833,344 B2 | 11/2010 | Santra et al. |
| 7,847,049 B2 | 12/2010 | Ito et al. |
| 7,893,011 B2 | 2/2011 | Lewis et al. |
| 7,893,168 B2 | 2/2011 | Ito et al. |
| 7,943,718 B2 | 5/2011 | Ito et al. |
| 7,981,943 B2 | 7/2011 | Ito et al. |
| 8,007,911 B2 | 8/2011 | Ito et al. |
| 8,017,688 B2 | 9/2011 | Ito et al. |
| 8,142,562 B2 | 3/2012 | Klettke et al. |
| 8,309,498 B2 | 11/2012 | Funkhouser et al. |
| 8,382,476 B2 | 2/2013 | Schulte et al. |
| 8,418,763 B1 | 4/2013 | Deen et al. |
| 8,450,252 B2 | 5/2013 | Funkhouser et al. |
| 8,450,415 B2 | 5/2013 | Ito et al. |
| 8,580,906 B2 | 11/2013 | Hayashi et al. |
| 8,673,364 B2 | 3/2014 | Jalota et al. |
| 9,023,150 B2 | 5/2015 | Brenneis et al. |
| 9,068,051 B2 | 6/2015 | Yamasaki et al. |
| 9,266,972 B2 | 2/2016 | Yamasaki et al. |
| 9,375,699 B2 | 6/2016 | Ladet |

(Continued)

FOREIGN PATENT DOCUMENTS

| | | |
|---|---|---|
| CN | 104204035 | 12/2014 |
| CN | 107522436 | 12/2017 |

(Continued)

OTHER PUBLICATIONS

U.S. Appl. No. 16/593,820, Patel et al., filed Oct. 4, 2019.
U.S. Appl. No. 16/668,730, Patel et al., filed Oct. 30, 2019.
"Recommended Practice for Testing Well Cements," American Petroleum Institute, RP 10B-2, Second Edition, Apr. 2013, 124 pages.
asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.

(Continued)

*Primary Examiner* — Wenwen Cai
(74) *Attorney, Agent, or Firm* — Fish & Richardson P.C.

(57) ABSTRACT

This document relates to methods for preventing or inhibiting the cracking or explosion of cement in an oil well using cement compositions that contain polyrotaxane additives. The cement compositions containing the polyrotaxane additives exhibit increased resiliency to cracking as compared to the same cement without the polyrotaxane additive.

14 Claims, 5 Drawing Sheets

(56) References Cited

U.S. PATENT DOCUMENTS

| | | | |
|---|---|---|---|
| 9,428,682 B2 | 8/2016 | Muthusamy et al. | |
| 9,617,460 B2 | 4/2017 | Reddy | |
| 9,708,869 B2 | 7/2017 | Sarmah et al. | |
| 10,060,242 B2 | 8/2018 | Benoit et al. | |
| 10,150,905 B1 | 12/2018 | Reddy | |
| 10,647,909 B2 | 5/2020 | Li et al. | |
| 10,836,950 B1 | 11/2020 | Patel et al. | |
| 2003/0138398 A1 | 7/2003 | Okumura et al. | |
| 2006/0048671 A1 | 3/2006 | Ong | |
| 2006/0086503 A1* | 4/2006 | Reddy | C04B 28/34 |
| | | | 166/293 |
| 2008/0156225 A1 | 7/2008 | Bury | |
| 2008/0287633 A1 | 11/2008 | Drumheller | |
| 2009/0030108 A1 | 1/2009 | Ito et al. | |
| 2009/0214871 A1 | 8/2009 | Fukuda et al. | |
| 2009/0312491 A1 | 12/2009 | Ito et al. | |
| 2010/0006288 A1 | 1/2010 | Santra et al. | |
| 2012/0006551 A1 | 1/2012 | Carman et al. | |
| 2012/0322695 A1 | 12/2012 | Kefi et al. | |
| 2013/0118740 A1 | 5/2013 | Sherman et al. | |
| 2014/0096964 A1 | 4/2014 | Chakraborty et al. | |
| 2014/0342531 A1 | 11/2014 | Tominaga et al. | |
| 2015/0033719 A1 | 2/2015 | Lawrence et al. | |
| 2015/0057196 A1 | 2/2015 | Debord et al. | |
| 2015/0198008 A1 | 7/2015 | Smith et al. | |
| 2016/0102238 A1 | 4/2016 | Muthusamy et al. | |
| 2016/0177655 A1 | 6/2016 | Fripp | |
| 2017/0218248 A1 | 8/2017 | Boul et al. | |
| 2017/0369761 A1 | 12/2017 | Jones et al. | |
| 2018/0045870 A1 | 2/2018 | Asahi et al. | |
| 2018/0215988 A1 | 8/2018 | Gamwell et al. | |
| 2019/0310396 A1 | 10/2019 | Matsumoto et al. | |
| 2020/0325070 A1 | 10/2020 | Patel et al. | |
| 2021/0024806 A1 | 1/2021 | Patel et al. | |
| 2021/0101833 A1 | 4/2021 | Thaemlitz et al. | |
| 2021/0102112 A1 | 4/2021 | Patel | |
| 2021/0130676 A1 | 5/2021 | Patel et al. | |

FOREIGN PATENT DOCUMENTS

| | | |
|---|---|---|
| CN | 109133754 | 1/2019 |
| EP | 0383348 | 8/1990 |
| JP | H 10158045 | 6/1998 |
| JP | 2016088878 | 5/2016 |
| JP | 6647751 | 2/2020 |
| WO | WO 2016053319 | 4/2016 |
| WO | WO 2016080674 | 5/2016 |
| WO | WO 2019147559 | 8/2019 |

OTHER PUBLICATIONS

Choi et al., "Highly elastic binders integrating polyrotaxanes for silicon microparticle anodes in lithium ion batteries," Science, 357, 279, Jul. 2017, 5 pages.

Funkhouser and Norman, "Synthetic Polymer Fracturing Fluid for High-Temperature Application", SPE 80236, Society of Petroleum Engineers (SPE), International Symposium on Oilfield Chemistry, Feb. 5-7, 2003, 6 pages.

Gaillard et al., "Novel Associative Acrylamide-based Polymers for Proppant Transport in Hydraulic Fracturing Fluids", SPE 164072, Society of Petroleum Engineers (SPE), SPE International Symposium on Oilfield Chemistry, Apr. 8-10, 2013, 11 pages.

Gupta and Carman, "Fracturing Fluid for Extreme Temperature Conditions is Just as Easy as the Rest", SPE 140176, Society of Petroleum Engineers (SPE), SPE Hydraulic Fracturing Technology Conference, Jan. 24-26, 2011, 5 pages.

Harada et al., "Preparation and properties of inclusion complexes of polyethylene glycol with .alpha.-cyclodextrin," Macromolecules, 1993, 26:5698-5703, 6 pages.

Liu et al. "Graphene Lubricant", Applied Materials Today, 20 (2020), 100662, 31 pages.

Liu et al., "A novel method to evaluate cement shale bond strength," SPE International Symposium on Oilfield Chemistry, SPE-173802-MS, Apr. 13-15, 2015, 20 pages.

Opedal et al., "Experimental study on the cement-formation bonding," SPE International Symposium and Exhibition on Formation Damage Control, Feb. 26-28, 2014, 12 pages.

Radonjic and Oyibo, "Experimental evaluation of wellbore cement-formation shear bond strength in presence of drilling fluid contamination," International Conference on porous media and their applications in science, engineering and industry, Hawaii, Jun. 24, 2014, 7 pages.

Zoback, "Reservoir geomechanics," Cambridge University Press, 2010.

PCT International Search Report and Written Opinion in International Appln. No. PCT/US2022/019283, dated Jun. 29, 2022, 14 pages.

* cited by examiner

POLYROTAXANE-REINFORCED SETTABLE FLUIDS WITH ENTRAPPED GAS PHASE UNDER HIGH PRESSURE

TECHNICAL FIELD

This disclosure describes cement compositions having the ability to avoid cracking and exhibiting resiliency against cracking and methods of using the compositions to prevent cracking and explosion in the cement compositions when subjected to negative pressure.

BACKGROUND

Set cements, including Portland cement, pozzolanic cement and non-Portland cements like Sorel cements, and high alumina cement, are inherently brittle. Therefore, when gases are trapped in cement under high pressure or differential pressure, such as with foamed set cement, the cement can experience tremendous explosive pressure, causing the cement to crack. The problem can be very severe when gas is entrapped inside a set cement under high pressure, followed by release of the pressure to the atmosphere. The brittle nature of the set cement often cannot hold the explosive pressure exerted on the cement matrix. The problem is aggravated when the percentage of gas volume in the cement matrix is high, which typically reduces the compressive strength of the cement itself. Thus, it is important to reinforce the cement matrix such that the cement can survive such explosive scenarios.

SUMMARY

Provided in the present disclosure is a cement composition comprising cement and a slurry, where the slurry comprises a polyrotaxane additive selected from a cross-linked polyrotaxane and a sliding-ring polymer; and a gas-generating compound.

In some embodiments, the cross-linked polyrotaxane comprises a polyrotaxane comprising a polymer and at least one ring compound, wherein the polymer is threaded through the cavity of the ring compound; and a cross-linker.

In some embodiments, the polymer is selected from the group consisting of a polyethylene glycol (PEG), a propylene glycol (PPG), a block copolymer of PEG and PPG, and a polysiloxane (PS). In some embodiments, the polymer terminates with one or more of —$NH_2$, —COOH, —$N_3$, —OH, —$CH_2$=$CH_2$, —$COCH_2(CH_3)$=$CH_2$, —SH, —COCl, or a halide. In some embodiments, the polymer is a PEG or a polysiloxane that terminates with one or more —$NH_2$ groups. In some embodiments, the polymer is a PEG or a polysiloxane that terminates with one or more —COOH groups. In some embodiments, the polymer has a molecular weight of about 1 kilodalton (kDa) to about 50 kDa, about 5 kDa to about 40 kDa, or about 20 kDa to about 30 kDa.

In some embodiments, the ring compound is a cyclodextrin or cyclodextrin derivative. In some embodiments, the cyclodextrin is selected from the group consisting of α-cyclodextrin (α-CD), β-cyclodextrin (β-CD), and γ-cyclodextrin (γ-CD) and combinations thereof.

In some embodiments, the polyrotaxane is γ-CD-PS-$NH_2$, β-CD-PPG-$NH_2$, and α-CD-PEG-$NH_2$. In some embodiments, the polyrotaxane comprises a stopper group at one or more ends of the polymer. In some embodiments, the stopper group is selected from the group consisting of adamantaneacetic acid, a dinitrofluorophenyl group, a cyclodextrin, an amine-terminated aromatic compound, and combinations thereof.

In some embodiments, the cross-linker is cyanuric chloride (CC).

In some embodiments, the cross-linked polyrotaxane is selected from the group consisting of sliding-ring polymer A, γ-CD-PS-NH-CC, α-CD-PEG-NH-CC, and β-CD-PPG-NH-CC.

In some embodiments of the cement composition, the sliding-ring polymer comprises a functionalized polyrotaxane, wherein the polyrotaxane comprises a polymer and at least one functionalized ring compound, wherein the polymer is threaded through the cavity of the functionalized ring compound; and a high molecular weight polymer.

In some embodiments, the polymer is selected from the group consisting of a polyethylene glycol (PEG), a propylene glycol (PPG), a block copolymer of PEG and PPG, and a polysiloxane (PS). In some embodiments, the polymer terminates with one or more of —$NH_2$, —COOH, —$N_3$, —OH, —$CH_2$=$CH_2$, —$COCH_2(CH_3)$=$CH_2$, —SH, —COCl, or a halide. In some embodiments, the polymer is a PEG or a polysiloxane that terminates with one or more —$NH_2$ groups. In some embodiments, the polymer is a PEG or a polysiloxane that terminates with one or more —COOH groups. In some embodiments, the polymer has a molecular weight of about 1 kilodalton (kDa) to about 50 kDa, about 5 kDa to about 40 kDa, or about 20 kDa to about 30 kDa.

In some embodiments, the functionalized ring compound is a cyclodextrin or cyclodextrin derivative functionalized with one or more functional groups selected from the group consisting of methyl, hydroxypropyl, trityl, acetyl, trimethylsilyl, phenylcarbamyl, dansyl, and nitryl.

In some embodiments, the polyrotaxane comprises a stopper group at one or more ends of the polymer. In some embodiments, the stopper group is selected from the group consisting of adamantaneacetic acid, a dinitrofluorophenyl group, a cyclodextrin, an amine-terminated aromatic compound, and combinations thereof.

In some embodiments, the high molecular weight polymer is selected from the group consisting of polyacrylic acid, polyacrylamide, polyurethane, polycaprolactone, and combinations thereof. In some embodiments, the high molecular weight polymer has a molecular weight of about 100 kDa to about 5000 kDa, about 200 kDa to about 1000 kDa, or about 250 kDa to about 500 kDa.

In some embodiments, the amount of polyrotaxane additive in the slurry is between about 0.5% to about 10%, about 2% to about 8%, or about 4% to about 6% by weight of the slurry.

In some embodiments, the gas-generating compound is a nitrogen gas-generating compound. In some embodiments, the nitrogen gas-generating compound is azodicarboxamide.

In some embodiments, the cement is selected from the group consisting of Portland cement, pozzolanic cement, Sorel cements, high alumina cements, and a brittle settable cement.

In some embodiments, the cement composition comprises one or more of a foaming agent, a viscosifier, and a retarder.

In some embodiments, the cement composition further comprises water.

In some embodiments, the cement composition exhibits improved resiliency against cracking as compared to the same cement composition without the polyrotaxane additive.

Also provided in the present disclosure is a method of preparing a foamed cement composition, the method comprising preparing a slurry comprising a gas-generating compound and a polyrotaxane additive selected from a cross-linked polyrotaxane and a sliding-ring polymer; and mixing the slurry with cement and a foaming agent.

Also provided in the present disclosure is a method for preventing cracking in the cement with entrapped gas of an oil well when the gas is subjected to a negative change in pressure, the method comprising providing to the oil well a cement composition comprising cement and a slurry comprising a gas-generating compound and a polyrotaxane additive selected from a cross-linked polyrotaxane and a sliding-ring polymer.

Also provided in this disclosure is a method of improving the resiliency of a foamed cement composition to cracking, comprising adding a polyrotaxane additive selected from a cross-linked polyrotaxane and a sliding-ring polymer to a cement composition, wherein the resiliency of the foamed cement composition to cracking is greater than the resiliency of the same cement composition to cracking without the polyrotaxane additive.

DESCRIPTION OF DRAWINGS

FIG. 1A illustrates a polyrotaxane made up of a polymer/macromolecule, ring/cyclic molecules, and a capping agent (stopper). FIG. 1B shows a sliding-ring polymer.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Figure 1A:
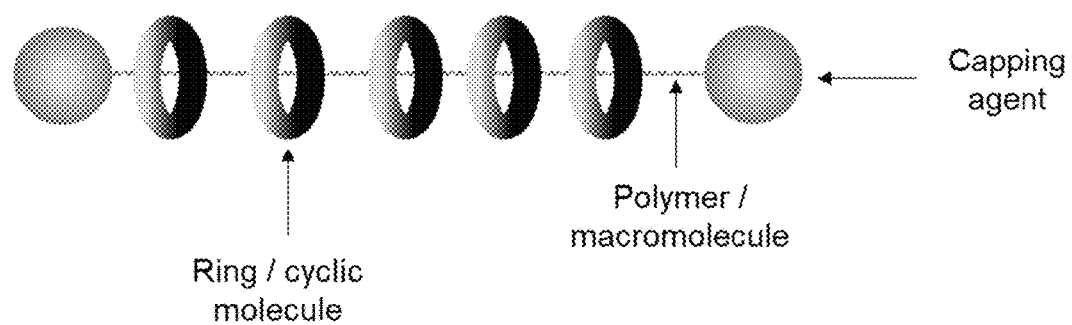
FIGS. 1A-1B show exemplary polyrotaxanes.
Figure 1B:
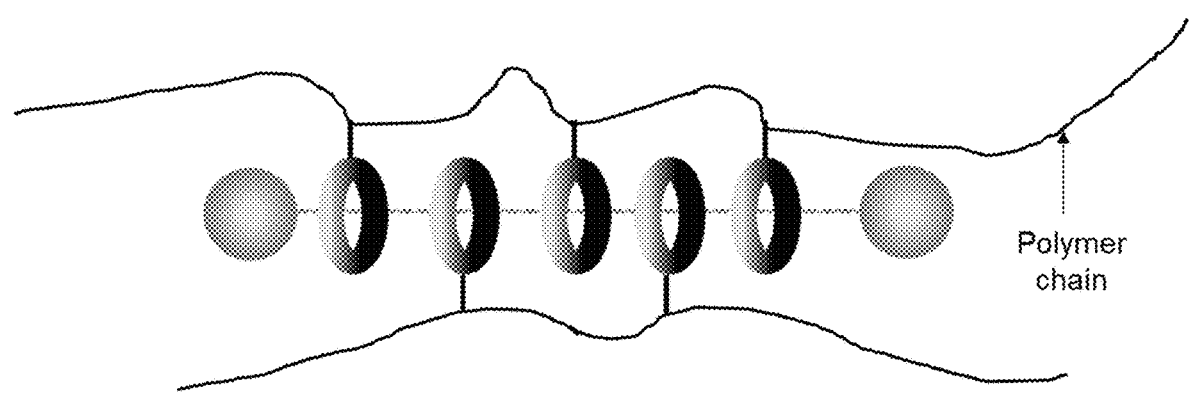
Figure 5:
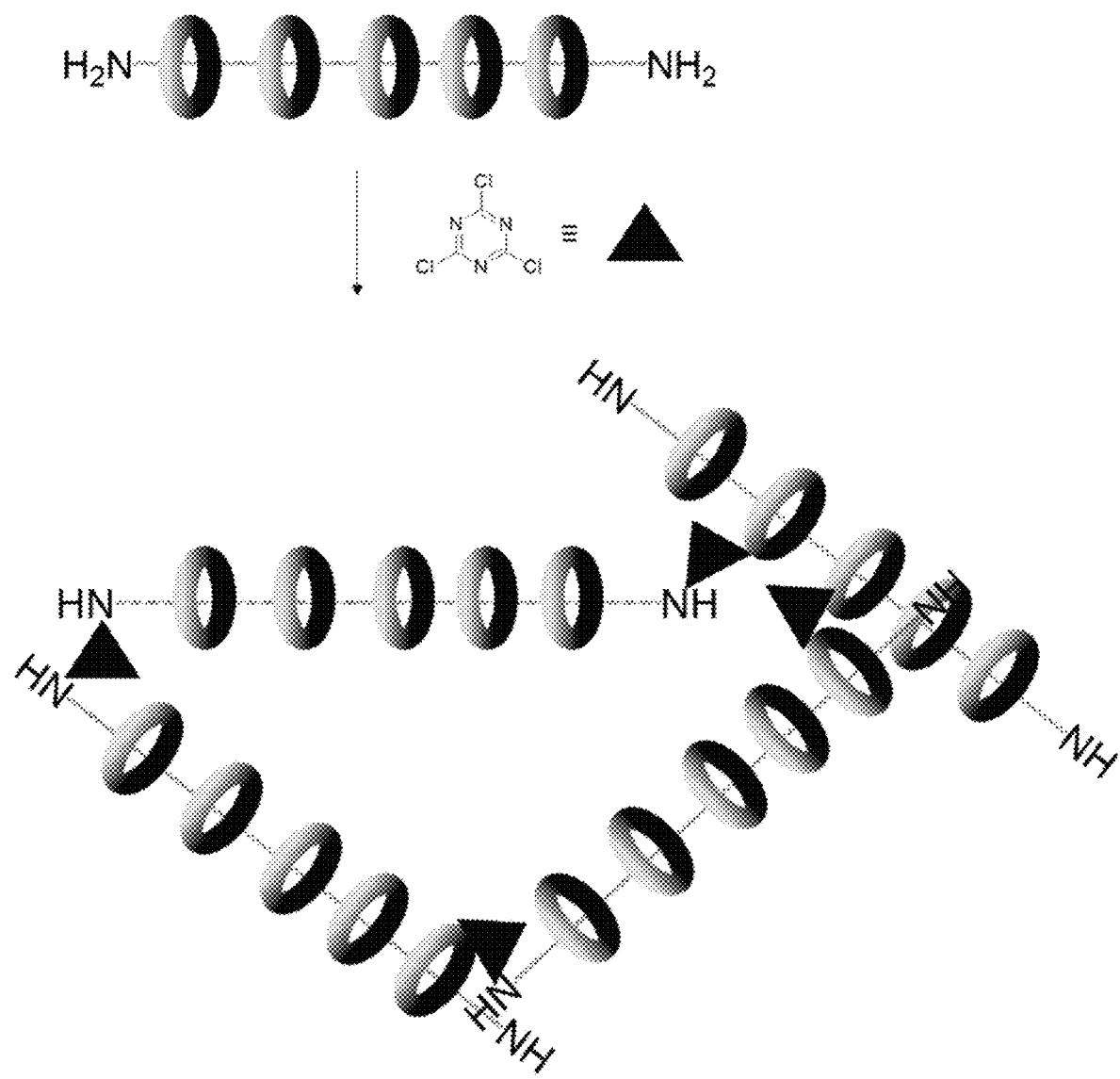
FIG. 5 is a schematic of the synthesis of a cross-linked polyrotaxane cross-linked via cyanuric chloride reaction between the amine terminal groups of the polymer of the polyrotaxane and functional groups of the ring compounds of the polyrotaxane.

The present application provides compositions, such as cement compositions containing a polyrotaxane additive, and methods for improving the resiliency against cracking of cement, such as cement containing a high volume of gas in the matrix, such as a foamed cement. Also provided are methods for preventing cracking or explosion of cement, such as foamed cements containing entrapped gas, when the cement experiences negative or explosive pressure. The cement compositions of the present disclosure include chemical structures called polyrotaxanes. The polyrotaxanes are made up of a linear polymer that forms an axis and one or more ring compounds, where the dissociation of a ring from an axis is hindered by a stopper group (FIG. 1A). These structures contain a movable crosslinked mechanical bond that allows the polymer chains to slide within the material. The polyrotaxanes can be cross-linked, as shown in FIG. 1B and FIG. 5. The crosslinked polyrotaxanes are unlike conventional polymeric additives that contain permanently-linked covalent bonds that restrict the motion of the polymer chains. Without wishing to be bound by any particular theory, it is believed that the sliding characteristics of the polyrotaxane structures facilitate the dispersion of stresses throughout the set cement matrix, whereas the links in conventional polymers tend to break over repeated cycles of stresses.

In addition to enhancing stress distribution in cement, the polyrotaxanes of the present disclosure provide the ability to prevent explosion or cracking in cement, such as foamed cement or cement that contains a high percentage of gas volume within the cement matrix, such as when the entrapped gas is brought to atmospheric pressure. The addition of the polyrotaxanes in the foamed cement imparts improvement in the properties of the cement, especially compressive strength and resiliency against cracking.

Thus, the materials and compositions described in the present disclosure prevent explosion or cracking of cement containing entrapped gas when subjected to a negative change in pressure, and improve the resiliency against cracking of the set cement, such as a foamed cement.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "polyrotaxane" refers to a compound having cyclic molecules, a linear molecule included in the cyclic molecules such that the linear molecule is threaded through the cyclic molecules. In some embodiments, there are stopper groups disposed at both ends of the linear molecule so as to prevent the cyclic molecules from separating from the linear molecule. The cyclic molecules can move along the axis.

As used in this disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble. Any cement can be used in the compositions of the present application.

As used in this disclosure, the term "set" can mean the process of a fluid slurry (for example, a cement slurry) becoming a hard solid. Depending on the composition and the conditions, it can take just a few minutes up to 72 hours or longer for some cement compositions to initially set.

The term "compressive strength" refers to the measure of the cement's ability to resist loads which tend to compress it or reduce size. Cement composition compressive strengths can vary from 0 psi to over 10,000 psi (0 to over 69 MPa). Compressive strength is generally measured at a specified time after the composition has been mixed and at a specified temperature and pressure. In some embodiments, compressive strength is measured by a non-destructive method that continually measures correlated compressive strength of a cement composition sample throughout the test period by utilizing a non-destructive sonic device. For example, compressive strength of a cement composition can be measured using the non-destructive method according to ANSI/API Recommended Practice 10-B2 at a specified time, temperature, and pressure.

The term "downhole," as used in this disclosure, can refer to under the surface of the earth, such as a location within or fluidly connected to a wellbore.

Polyrotaxane Additives

Provided in this disclosure are polyrotaxane additives that contain a polyrotaxane comprising a polymer and at least one ring compound, where the polymer is threaded through the cavity of the ring compound. In some embodiments, the polymer is selected from the group consisting of a polyethylene glycol (PEG), a propylene glycol (PPG), a block copolymer of PEG and PPG, and a polysiloxane (PS). In some embodiments, the ring compound is a cyclodextrin or cyclodextrin derivative. In some embodiments, the polyrotaxane is cross-linked to form a cross-linked polyrotaxane. In some embodiments, the polyrotaxane is functionalized and anchored to one or more high molecular weight polymers.

Polyrotaxanes

Figure 3:
FIG. 3 is a schematic of an inclusion complex formed from a polymer and ring compounds, where R is a terminal group.

The polyrotaxanes of the present disclosure are made up of a polymer and at least one ring compound, where the polymer is threaded through the cavity of the ring compound. An exemplary polyrotaxane is shown in FIG. 3.

Polymers

The polymer that can be included in the polyrotaxanes of the present disclosure can be any polymer that can be included in a ring compound such that the polymer is threaded through the cavity of the ring compound. In some embodiments, the polymer is a linear polymer. In some embodiments, the polymer is a block polymer. In some embodiments, the polymer is a branched polymer.

Examples of the suitable polymers include, but are not limited to, polyvinyl alcohol, polyvinylpyrrolidone, poly (meth)acrylic acid, cellulose resins (for example, carboxymethylcellulose, hydroxyethylcellulose, and hydroxypropylcellulose), polyacrylamide, polyethylene glycol, polypropylene glycol, polyvinyl acetal resins, polyvinyl methyl ether, polyamine, polyethyleneimine, casein, gelatin, starch, and copolymers thereof; polyolefin resins such as polyethylene and polypropylene; polyester resins; polyvinyl chloride resins; polystyrene resins such as polystyrene and acrylonitrile-styrene copolymer resins; acrylic resins such as polymethyl methacrylate, (meth)acrylate copolymers, and acrylonitrile-methyl acrylate copolymer resins; polycarbonate resins; polyurethane resins; vinyl chloride-vinyl acetate copolymer resins; polyvinyl butyral resins; polyisobutylene; polytetrahydrofuran; polyaniline; acrylonitrile-butadiene-styrene copolymers (ABS resins); polyamides such as nylon; polyimides; polydienes such as polyisoprene and polybutadiene; polysiloxanes such as polydimethylsiloxane; polysulfones; polyimines; polyacetic anhydrides; polyureas; polysulfides; polyphosphazenes; polyketones; polyphenylenes; polyhaloolefins; and derivatives of these resins. In some embodiments, the polymer is selected from the group consisting of a polyethylene glycol (PEG), a propylene glycol (PPG), a block copolymer of PEG and PPG, and a polysiloxane (PS). In some embodiments, the polymer is a PEG. In some embodiments, the polymer is a PS.

The polymer of the polyrotaxane can terminate with a functional group. In some embodiments, the functional group is selected from the group consisting of —NH₂, —COOH, —N₃, —OH, —CH₂=CH₂, —COCH₂(CH₃)=CH₂, —SH, —COCl, and a halide (for example, —F, —Cl, —Br, or —I). In some embodiments, the functional group is —NH₂. In some embodiments, the functional group is —COOH. In some embodiments, the polymer is a linear polymer that terminates on each end with the same functional group. In some embodiments, the linear polymer terminates on one end with one functional group and on the other end with a different functional group. In some embodiments, the polymer is a PEG that terminates with one or more —NH₂ groups. In some embodiments, the polymer is a polysiloxane that terminates with one or more —NH₂ groups. In some embodiments, the polymer is a PEG that terminates with one or more —COOH groups. In some embodiments, the polymer is a polysiloxane that terminates with one or more —COOH groups.

In some particular embodiments, the polymer of the polyrotaxane of the present disclosure is selected from among the group consisting of a polyethylene glycol (PEG) having the structure:

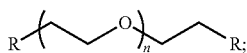

a polypropylene glycol (PPG) having the structure:

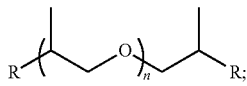

and a polysiloxane (PS) having the structure:

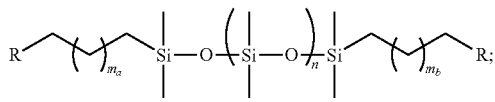

where R is selected from —NH₂, —COOH, —N₃, —OH, —CH₂=CH₂, —COCH₂(CH₃)=CH₂, —SH, —COCl, and a halide; n is about 10 to about 1000; $m_a$ is about 10 to about 500; and $m_b$ is about 10 to about 500.

In some embodiments, the polymer has a molecular weight of about 1 kDa to about 50 kDa, for example, about 1 kDa to about 45 kDa, about 1 kDa to about 40 kDa, about 1 kDa to about 35 kDa, about 1 kDa to about 30 kDa, about 1 kDa to about 25 kDa, about 1 kDa to about 20 kDa, about 1 kDa to about 15 kDa, about 1 kDa to about 10 kDa, about 1 kDa to about 5 kDa, about 5 kDa to about 50 kDa, about 5 kDa to about 45 kDa, about 5 kDa to about 40 kDa, about 5 kDa to about 35 kDa, about 5 kDa to about 30 kDa, about 5 kDa to about 25 kDa, about 5 kDa to about 20 kDa, about 5 kDa to about 15 kDa, about 5 kDa to about 10 kDa, about 10 kDa to about 50 kDa, about 10 kDa to about 45 kDa, about 10 kDa to about 40 kDa, about 10 kDa to about 35 kDa, about 10 kDa to about 30 kDa, about 10 kDa to about 25 kDa, about 10 kDa to about 20 kDa, about 10 kDa to about 15 kDa, about 15 kDa to about 50 kDa, about 15 kDa to about 45 kDa, about 15 kDa to about 40 kDa, about 15 kDa to about 35 kDa, about 15 kDa to about 30 kDa, about 15 kDa to about 25 kDa, about 15 kDa to about 20 kDa, about 20 kDa to about 50 kDa, about 20 kDa to about 45 kDa, about 20 kDa to about 40 kDa, about 20 kDa to about 35 kDa, about 20 kDa to about 30 kDa, about 20 kDa to about 25 kDa, about 25 kDa to about 50 kDa, about 25 kDa to about 45 kDa, about 25 kDa to about 40 kDa, about 25 kDa to about 35 kDa, about 25 kDa to about 30 kDa, about 30 kDa to about 50 kDa, about 30 kDa to about 45 kDa, about 30 kDa to about 40 kDa, about 30 kDa to about 35 kDa, about 40 kDa to about 50 kDa, about 40 kDa to about 45 kDa, about 45 kDa to about 50 kDa, or about 1 kDa, about 5 kDa, about 10 kDa, about 15 kDa, about 20 kDa, about 25 kDa, about 30 kDa, about 35 kDa, about 40 kDa, about 45 kDa, or about 50 kDa. In some embodiments, the molecular weight of the polymer is about 1 kDa to about 50 kDa. In some embodiments, the molecular weight of the polymer is about 5 kDa to about 40 kDa. In some embodiments, the molecular weight of the polymer is about 20 kDa to about 30 kDa.

Ring Compounds

The polyrotaxanes of the present disclosure include one or more ring compounds, where the polymer is threaded through the cavity of the ring compound. The ring compound can be any ring compound that allows for threading of a polymer through the cavity of the ring.

In some embodiments, the ring compound is a cyclodextrin or a cyclodextrin derivative. Examples of suitable ring compounds include, but are not limited to, α-cyclodextrin (α-CD), β3-cyclodextrin (β-CD), γ-cyclodextrin (γ-CD), and derivatives thereof. Cyclodextrin derivatives are compounds obtained by substituting hydroxyl groups of cyclodextrin with polymer chains, substituents, or both. Examples of suitable polymer chains include, but are not limited to, polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, α-cyclodextrin (the number of glucose residues=6, inner diameter of opening=about 0.45 to 0.6 μm), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis (2,6-di-O-m ethyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2, 3,6-tri-O-acetyl)-β-cyclodextrin, heptakis(2,3,6-tri-O-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethyl amino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)β- cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS,3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The ring compounds, such as the cyclodextrins listed in the present disclosure, can be used alone or in combination of two or more.

In some embodiments, the ring compound is α-cyclodextrin having the structure:

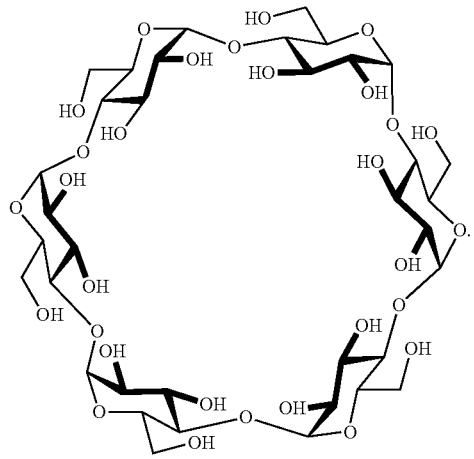 [SMILES: OCC1O[C@@H]2O[C@@H]3C(CO)O[C@H](O[C@@H]4C(CO)O[C@H](O[C@@H]5C(CO)O[C@H](O[C@@H]6C(CO)O[C@H](O[C@@H]7C(CO)O[C@H](O[C@H]1[C@H](O)[C@H]2O)[C@H](O)[C@H]7O)[C@H](O)[C@H]6O)[C@H](O)[C@H]5O)[C@H](O)[C@H]4O)[C@H](O)[C@H]3O]

In some embodiments, the ring compound is β-cyclodextrin having the structure:

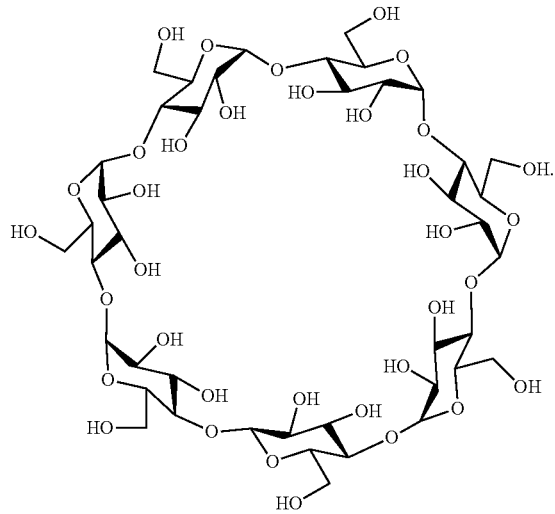 [SMILES: OCC1O[C@@H]2O[C@@H]3C(CO)O[C@H](O[C@@H]4C(CO)O[C@H](O[C@@H]5C(CO)O[C@@H](O[C@@H]6C(CO)O[C@@H](O[C@@H]7C(CO)O[C@H](O[C@@H]8C(CO)O[C@H](O[C@H]1C(O)C2O)C(O)C8O)C(O)C7O)C(O)C6O)C(O)C5O)C(O)C4O)C(O)C3O]

In some embodiments, the ring compound is γ-cyclodextrin having the structure:

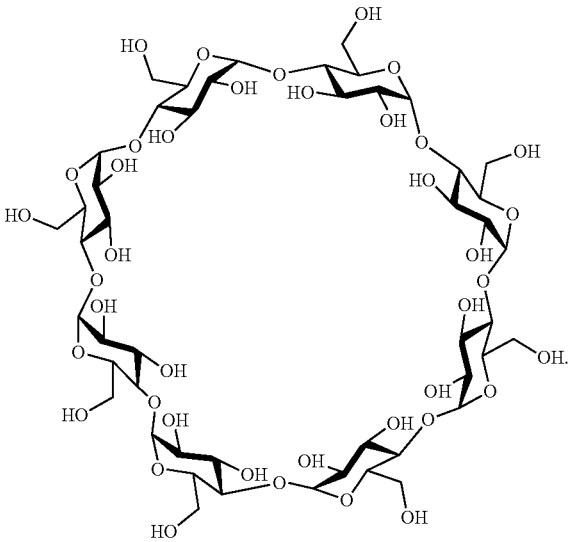 [SMILES: OCC1O[C@@H]2O[C@@H]3C(CO)O[C@H](O[C@@H]4C(CO)O[C@H](O[C@@H]5C(CO)O[C@H](O[C@@H]6C(CO)O[C@@H](O[C@@H]7C(CO)O[C@H](O[C@@H]8C(CO)O[C@H](O[C@@H]9C(CO)O[C@H](O[C@H]1[C@H](O)C2O)C(O)[C@H]9O)C(O)[C@H]8O)C(O)[C@H]7O)C(O)[C@H]6O)C(O)[C@H]5O)C(O)[C@H]4O)C(O)[C@H]3O]

In some embodiments, the amount of ring compound on the polymer chain is about 20 wt % to about 70 wt %, such as about 20 wt % to about 65 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 70 wt %, about 25 wt % to about 65 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 70 wt %, about 30 wt % to about 65 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 70 wt %, about 35 wt % to about 65 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 70 wt %, about 40 wt % to about 65 wt %, about 40 wt % to about 60 wt %, about 40 wt % to about 55 wt %, about 40 wt % to about 50 wt %, about 40 wt % to about 45 wt %, about 45 wt % to about 70 wt %, about 45 wt % to about 65 wt %, about 45 wt % to about 60 wt %, about 45 wt % to about 55 wt %, about 45 wt % to about 50 wt %, about 50 wt % to about 70 wt %, about 50 wt % to about 65 wt %, about 50 wt % to about 60 wt %, about 50 wt % to about 55 wt %, about 55 wt % to about 70 wt %, about 55 wt % to about 65 wt %, about 55 wt % to about 60 wt %, about 60 wt % to about 70 wt %, about 60 wt % to about 65 wt %, about 65 wt % to about 70 wt % or about 20 wt %, about 25 wt %, about 30 wt %, about 35 wt %, about 40 wt %, about 45 wt %, about 50 wt %, about 55 wt %, about 60 wt %, about 65 wt %, or about 70 wt %. In some embodiments, the amount of ring compound on the polymer chain is about 20 wt % to about 70 wt %. In some embodiments, the amount of ring compound on the polymer chain is about 50 wt % to about 60 wt %. In some embodiments, the amount of ring compound on the polymer chain is about 30 wt % to about 40 wt %. In some embodiments, the ring compound is a cyclodextrin or cyclodextrin derivative and the amount on the polymer chain is about 20 wt % to about 70 wt %. In some embodiments, the ring compound is a cyclodextrin or cyclodextrin derivative and the amount on the polymer chain is about 50 wt % to about 60 wt %.

Polyrotaxanes and Amount of Inclusion

The polyrotaxanes of the present disclosure contain a polymer, for example, polyethylene glycol (PEG), polypropylene glycol (PPG), block copolymers of PEG and PPG, and polysiloxanes (PS) that are terminated with one or more of —$NH_2$, —COOH, —$N_3$, —OH, —$CH_2$=$CH_2$, —$COCH_2(CH_3)$=$CH_2$, —SH, —COCl, and halides; and ring components that include, for example, α-cyclodextrin (α-CD), β-cyclodextrin (β-CD), and γ-cyclodextrin (γ-CD). In some embodiments, the polyrotaxane is selected from γ-CD-PS-$NH_2$, γ-CD-PS-COOH, α-CD-PEG-$NH_2$, α-CD-PEG-NH-DNF, ⊖-CD-PPG-$NH_2$, and γ-CD-PS-COOH-PNP. In some embodiments, the inclusion complex is selected from the group consisting of γ-CD-PS-$NH_2$, γ-CD-PS-COOH, β-CD-PPG-$NH_2$, and α-CD-PEG-$NH_2$.

In some embodiments, where a plurality of ring compounds include a polymer such that the polymer is threaded through the ring compounds, when the maximum amount of inclusion of one linear polymer in the ring compound is 1, the ring compounds can include the linear polymer in an amount of 0.001 to 0.6, such as 0.01 to 0.5, or 0.05 to 0.4.

The maximum amount of inclusion in the ring compounds can be calculated from the length of the polymer and the thickness of the ring compounds. For example, when the polymer is polyethylene glycol and the ring compounds are α-cyclodextrin molecules, the maximum amount of inclusion has been experimentally determined (see, for example, Macromolecules (1993) 26:5698-5703).

Stopper Group

Figure 4:
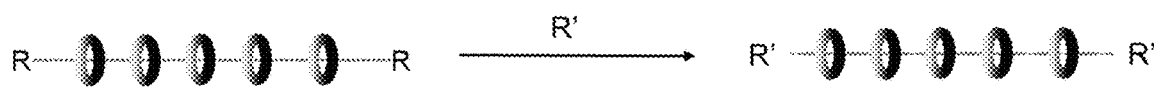
FIG. 4 shows end-capping of an inclusion complex, where R represents the terminal group of a polyrotaxane inclusion complex and R' represents the end-group capping agent.

In some embodiments, the polyrotaxane includes one or more stopper groups (or capping agents). The stopper groups can be any group that is disposed at an end of a polymer and acts to prevent separation of the ring compounds. A schematic of preparation of a polyrotaxane with stopper groups is shown in FIG. 4.

Examples of suitable stopper groups include, but are not limited to, dinitrophenyl groups, cyclodextrins, adamantane groups, trityl groups, fluoresceins, pyrenes, substituted benzenes, optionally substituted polynuclear aromatics, amine-terminated aromatic compounds, and steroids. Examples of substituents include, but are not limited to, alkyl groups such as methyl, alkyloxy groups such as methoxy, and hydroxy, halogen, cyano, sulfonyl, carboxyl, amino, and phenyl groups. One or more substituents can be present. In some embodiments, the stopper group is selected from the group consisting of adamantaneacetic acid, a dinitrofluorophenyl group, a cyclodextrin, an amine-terminated aromatic compound, and combinations thereof. In some embodiments, the stopper group is adamantaneacetic acid. In some embodiments, the stopper group is 2,4-dinitrofluorobenzene (DNF).

In some embodiments, functionalized polymers or organic-inorganic hybrids are used as capping agents. In some embodiments, the capping agent is a functionalized, nanoscale polymer particle or an organic-inorganic hybrid having functionality for reacting with the terminal group of the polymer of the polyrotaxane. In some embodiments, the functionalized, nanoscale polymers or inorganic particles or layered organic-inorganic hybrids (of nanoscale dimension) include functional groups such as carboxylate, amine, azide, isocyanate, carbonyl chloride, halides, and thiol, that are employed as capping agents.

Cross-Linked Polyrotaxanes

In some embodiments, the polyrotaxane additive of the present disclosure is a cross-linked polyrotaxane, where the polyrotaxanes of the present disclosure that include a polymer and one or more ring compounds are cross-linked with a cross-linking agent, or cross-linker, to form the cross-linked polyrotaxanes of the present disclosure.

Cross-Linkers

Examples of suitable cross-linkers include, but are not limited to, melamine resins, polyisocyanate compounds, block isocyanate compounds, cyanuric chloride, trimesoyl chloride, terephthaloyl chloride, epichlorohydrin, dibromobenzene, formaldehyde, glutaraldehyde, phenylenediisocyanate, tolylene diisocyanate, divinylsulfone, bisphenol A diglycidyl ether, diisopropylethylenediamine, 1,1-carbonyldiimidazole, and alkoxy silanes. The cross-linkers can be used alone or in combination. In some embodiments, the cross-linker is selected from the group consisting of trimesoyl chloride, formaldehyde, cyanuric chloride (CC), and bisphenol A diglycidyl ether (DGE). In some embodiments, the cross-linker is diisopropylethylenediamine. In some embodiments, the cross-linker is cyanuric chloride. In some embodiments, the cross-linker is bisphenol A diglycidyl ether.

In some embodiments, the amount of cross-linker in the cross-linked polyrotaxane is about 1 wt % to about 10 wt %, such as about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, about 9 wt % to about 10 wt %, or about 1 wt %, about 2 wt %, about 3 wt %, about 4 wt %, about 5 wt %, about 6 wt %, about 7 wt %, about 8 wt %, about 9 wt %, or about 10 wt %. In some embodiments, the amount of cross-linker in the cross-linked polyrotaxane is about 1 wt % to about 10 wt %. In some embodiments, the amount of cross-linker in the cross-linked polyrotaxane is about 2 wt % to about 7 wt %. In some embodiments, the amount of cross-linker in the cross-linked polyrotaxane is about 2 wt % to about 4 wt %. In some embodiments, the amount of cross-linker in the cross-linked polyrotaxane is about 3% by weight of the cross-linked polyrotaxane.

Thus, in some embodiments, the cross-linked polyrotaxane additive of the present disclosure contains a polymer and a ring compound and is cross-linked via a cross-linker as disclosed herein. In some embodiments, the polymer is a polysiloxane (PS) and ring compound is γ-cyclodextrin (γ-CD). In some embodiments, the polymer is a polypropylene glycol (PPG) and the ring compound is β-cyclodextrin (β-CD). In some embodiments, the polymer is a polyethylene glycol (PEG) and the ring compound is α-cyclodextrin (α-CD). In some embodiments, the cross-linked polyrotaxane is selected from the group consisting of γ-CD-PS-NH-CC and β-CD-PPG-NH-CC. In some embodiments, the cross-linked polyrotaxane is γ-CD-PS-NH-CC. In some embodiments, the cross-linked polyrotaxane is β-CD-PPG-NH-CC.

Sliding-Ring Polymers

Figure 2:
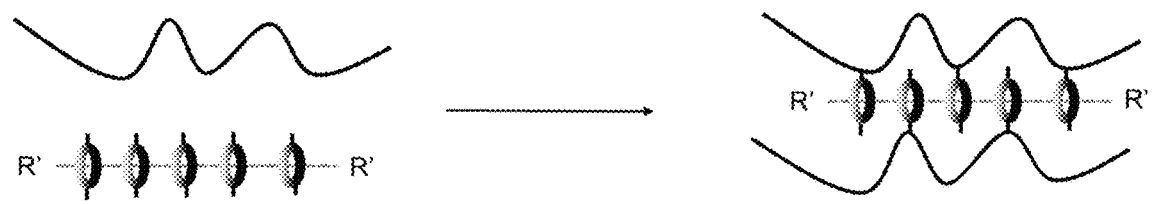
FIG. 2 illustrates the synthesis of a sliding-ring polymer of the present disclosure.

In some embodiments, the polyrotaxane additive of the present disclosure is a sliding-ring polymer, where the polyrotaxanes of the present disclosure that include a polymer and one or more ring compounds are functionalized and anchored to one or more high molecular weight polymers to form the sliding-ring polymers of the present disclosure. An exemplary sliding-ring polymer is shown in FIG. 2.

Functionalized Ring Compounds

Figure 6:
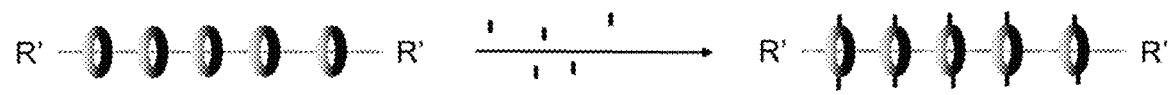
FIG. 6 shows functionalization of the surface of the ring group of the polyrotaxane with functional groups, where the dark lines above the arrow represent the functional groups.

In some embodiments, the ring compounds of the polyrotaxanes of the present disclosure are functionalized with one or more functional groups. A schematic of the preparation of a functionalized polyrotaxane is shown in FIG. 6. Exemplary functional groups include, but are not limited to, methyl, hydroxypropyl, trityl, acetyl, trimethylsilyl, phenylcarbamyl, dansyl, and nitryl. In some embodiments, the ring compound is a functionalized cyclodextrin or cyclodextrin derivative. In some embodiments, the ring compound is a functionalized cyclodextrin or cyclodextrin derivative functionalized with one or more functional groups selected from the group consisting of methyl, hydroxypropyl, trityl, acetyl, trimethylsilyl, phenylcarbamyl, dansyl, and nitryl. In some embodiments, the ring compound is a cyclodextrin functionalized with hydroxypropyl groups. In some embodiments, the ring compound is α-cyclodextrin (α-CD) functionalized with hydroxypropyl groups.

High Molecular Weight Polymers

In some embodiments, the polyrotaxane containing the functionalized ring compounds are cross-linked or anchored to high molecular weight polymers, such as polymers having a molecular weight of about 100 kDa or greater. Examples of such polymers include, but are not limited to polyacrylic acid, polyacrylamide, polyurethane, polycaprolactone, and combinations thereof. In some embodiments, the high molecular weight polymer is polyacrylic acid. In some embodiments, the high molecular weight polymer is functionalizing with one or more groups including, but not limited to, carboxylic acids, maleic acid, and amine groups.

In some embodiments, the high molecular weight polymer has a molecular weight of about 100 kDa to about 5000 kDa, for example, about 100 kDa to about 4500 kDa, about 100 kDa to about 4000 kDa, about 100 kDa to about 3500 kDa, about 100 kDa to about 3000 kDa, about 100 kDa to about 2500 kDa, about 100 kDa to about 2000 kDa, about 100 kDa to about 1500 kDa, about 100 kDa to about 1000 kDa, about 100 kDa to about 500 kDa, about 500 kDa to about 5000 kDa, about 500 kDa to about 4500 kDa, about 500 kDa to about 4000 kDa, about 500 kDa to about 3500 kDa, about 500 kDa to about 3000 kDa, about 500 kDa to about 2500 kDa, about 500 kDa to about 2000 kDa, about 500 kDa to about 1500 kDa, about 500 kDa to about 1000 kDa, about 1000 kDa to about 5000 kDa, about 1000 kDa to about 4500 kDa, about 1000 kDa to about 4000 kDa, about 1000 kDa to about 3500 kDa, about 1000 kDa to about 3000 kDa, about 1000 kDa to about 2500 kDa, about 1000 kDa to about 2000 kDa, about 1000 kDa to about 1500 kDa, about 1500 kDa to about 5000 kDa, about 1500 kDa to about 4500 kDa, about 1500 kDa to about 4000 kDa, about 1500 kDa to about 3500 kDa, about 1500 kDa to about 3000 kDa, about 1500 kDa to about 2500 kDa, about 1500 kDa to about 2000 kDa, about 2000 kDa to about 5000 kDa, about 2000 kDa to about 4500 kDa, about 2000 kDa to about 4000 kDa, about 2000 kDa to about 3500 kDa, about 2000 kDa to about 3000 kDa, about 2000 kDa to about 2500 kDa, about 2500 kDa to about 5000 kDa, about 2500 kDa to about 4500 kDa, about 2500 kDa to about 4000 kDa, about 2500 kDa to about 3500 kDa, about 2500 kDa to about 3000 kDa, about 3000 kDa to about 5000 kDa, about 3000 kDa to about 4500 kDa, about 3000 kDa to about 4000 kDa, about 3000 kDa to about 3500 kDa, about 4000 kDa to about 5000 kDa, about 4000 kDa to about 4500 kDa, about 4500 kDa to about 5000 kDa, or about 100 kDa, about 500 kDa, about 1000 kDa, about 1500 kDa, about 2000 kDa, about 2500 kDa, about 3000 kDa, about 3500 kDa, about 4000 kDa, about 4500 kDa, or about 5000 kDa. In some embodiments, the molecular weight of the polymer is about 100 kDa to about 5000 kDa. In some embodiments, the molecular weight of the polymer is about 200 kDa to about 1000 kDa. In some embodiments, the molecular weight of the polymer is about 250 kDa to about 50 kDa.

In some embodiments, the amount of polyrotaxanes anchored in sliding-ring polymers can vary from 1 wt % to 80 wt %, 2 wt % to 60 wt %, or 5 wt % to 15 wt %.

Slurries Containing the Polyrotaxane Additives

Also provided in the present disclosure are slurries containing the polyrotaxane additives of the present disclosure, where the polyrotaxane additive is selected from a cross-linked polyrotaxane of the present disclosure and a sliding-ring polymer of the present disclosure. In some embodiments, the slurry contains a gas-generating compound in addition to the polyrotaxane additive of the present disclosure.

In some embodiments, the gas-generating compound is a nitrogen gas-generating compound. Examples of suitable nitrogen gas-generating compounds include, but are not limited to, compounds containing hydrazine or azo groups, for example, hydrazine, azodicarbonamide, azobis (isobutyronitrile), p-toluene sulfonyl hydrazide, p-toluene sulfonyl semicarbazide, carbohydrazide, 4,4'-oxybis (benzenesulfonylhydrazide), and mixtures thereof. Other suitable nitrogen gas-generating compounds which do not contain hydrazine or azo groups include, but are not limited to, ammonium salts of organic or inorganic acids, hydroxylamine sulfate, carbamide and mixtures thereof.

In some embodiments, the nitrogen gas-generating compound included in the slurry of the present disclosure is an azo compound. In some embodiments the azo compound is a derivative of azodicarboxylic acid with the formula:

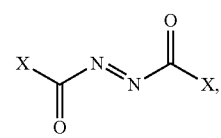

where X is independently selected from $NH_2$, a monoalkylamino group, a dialkylamino group, OH, $O^-M^{n+}$ (where $M^-$ is an alkali or alkaline earth metal), alkyl, aryl, or an alkoxy group. In some embodiments, the azodicarboxylic acid derivative is selected from an amide derivative, an ester derivative, and an alkali salt of the carboxylic derivative. In some embodiments, the nitrogen gas-generating azodicarboxylic acid derivative is azodicarbonamide (AZDC) with the structure:

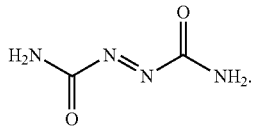

In some embodiments, the nitrogen gas-generating azodicarboxylic acid derivative is an ester represented selected from diisopropyl azodicarboxylate (DIAD) and diethyl azodicarboxylate (DEAD) represented by the structures:

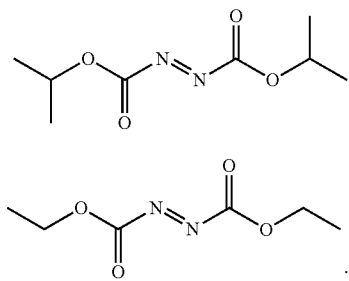

Other exemplary nitrogen gas-generating compounds include, but are not limited to, oxybis(benzenesulfonyl hydrazide, p-toluenesulfonyl hydrazide, p-toluenesulfonyl semicarbazide, and 5-phenyltetrazole.

In some embodiments, the slurry includes a nitrogen gas-generating compound in an amount of about 0.1% to about 10% by weight of the slurry. For example, the nitrogen gas-generating compound can be about 0.5% to about 10% by weight of the composition, such as about 0.5% to about 8%, about 0.5% to about 5%, about 0.5% to about 2.5%, about 0.5% to about 2%, about 0.5% to about 1.5%, about 0.5% to about 1%, about 1% to about 10%, about 1% to about 8%, about 1% to about 5%, about 1% to about 2.5%, about 1% to about 2%, about 1% to about 1.5%, about 1.5% to about 10%, about 1.5% to about 8%, about 1.5% to about 5%, about 1.5% to about 2.5%, about 1.5% to about 2%, about 2% to about 10%, about 2% to about 8%, about 2% to about 5%, about 2% to about 2.5%, about 2.5% to about 10%, about 2.5% to about 8%, about 2.5% to about 5%, about 5% to about 10%, about 5% to about 8%, about 8% to about 10%, or about 0.1%, about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, or about 10% by weight of the slurry. In some embodiments, the slurry contains about 1% to about 5% nitrogen gas-generating compound by weight of the slurry. In some embodiments, the slurry contains about 1% to about 2% nitrogen gas-generating compound by weight of the slurry. In some embodiments, the nitrogen gas-generating compound is azodicarbonamide.

In some embodiments, the slurry contains a viscosifier. Any traditional cement viscosifier can be used. Examples of suitable viscosifiers include, but are not limited to, hydroxyethylcellulose or its derivatives, hydroxypropylcellulose or its derivatives, natural gums like xanthan gum, welan gum, diutan gum and synthetic water-soluble polymer or co-polymer viscosifiers. In some embodiments, the viscosifier is xanthan.

In some embodiments, the slurry contains a retarder. Examples of suitable retarders include, but are not limited to, sodium hexametaphosphate, lignosulfonate, cellulose derivatives (hydroxyethyl cellulose, carboxymethyl hydroxyethyl cellulose), carboxylic acids and their derivatives (citric acid, tartaric acid, gluconic acid, glucoheptonate), and sugars (sucrose). In some embodiments, the retarder is sodium hexametaphosphate (SHMP).

In some embodiments, the pH of the slurry is about 3.5 or lower than about 3.5.

In some embodiments, the slurry includes water.

Cement Compositions Containing Polyrotaxane Additives

Also provided in this disclosure is a cement composition containing cement and a polyrotaxane additive, for example, a cross-linked polyrotaxane or sliding-ring polymer of the present disclosure, that exhibits improved compression strength as compared to the same cement composition that does not contain the polyrotaxane additive. In some embodiments, the cement composition contains cement and a slurry comprising the polyrotaxane additive and a gas-generating compound. In some embodiments, addition of the polyrotaxane additive prevents cracking or explosion of the cement subjected to a negative change in pressure ($\Delta P$), where $P(gas) \gg P(outside)$. In some embodiments, the cement composition contains one or more additional agents, such as a foaming agent, a viscosifier, or retarder. In some embodiments, the composition contains water.

Cement

The compositions of the present application contain cement and a polyrotaxane additive of the present disclosure. In some embodiments, the cement is a foamed cement, or a cement that has a gas phase trapped within the cement matrix. Examples of suitable cements include, but are not limited to, Portland cement, Pozzolanic cement, and non-Portland cements like Sorel cements, high alumina cement, magnesium oxychloride-based cement, and any other brittle settable cementitious material. In some embodiments, the cement composition has a large percentage of gas volume in the cement matrix.

Additional Components

In some embodiments, the cement composition includes water.

In some embodiments, the cement composition contains a foaming agent. In some embodiments, the foaming agent is a hydroxysultaine compound. An exemplary foaming agent is Petrostep™ SB (Stepan, Houston, TX).

Method of Preparing a Cement Composition

Provided in the present application is a method of preparing a cement composition, such as a cement composition described in this application. In some embodiments, the method includes: preparing a slurry comprising a gas-generating compound and a polyrotaxane additive selected from a cross-linked polyrotaxane and sliding-ring polymer of the present disclosure; and mixing the slurry with cement. In some embodiments, the slurry and cement are mixed with a foaming agent.

In some embodiments, the slurry is prepared and stored for a period of time prior to mixing with the cement. In some embodiments, the slurry can be stored at temperatures up to about 140° F. In some embodiments, such as when the cement composition is prepared at a well site and pumped downhole, the slurry is mixed with the cement and any additional materials at the well site and pumped downhole.

In some embodiments, the slurry is mixed with the cement and a foaming agent at the well site and pumped downhole.

Methods of Using the Cement Compositions Containing Polyrotaxane Additives

Provided in this disclosure is a method for preventing cracking or explosion in the cement of an oil well where the cement contains an entrapped gas phase. Also provided are methods for preventing cracking or explosion of any settable material with an entrapped gas phase.

The methods of the present disclosure provide the ability to prevent explosion or cracking in cement, such as foamed cement or cement that contains a high percentage of gas volume within the cement matrix, such as when the entrapped gas is brought to atmospheric pressure. In some embodiments, the percentage of gas volume depends upon the amount of nitrogen-generating agent compounded with the cement slurry. Theoretically, each azo group generates one molecule of $N_2$. The addition of the polyrotaxanes in the foamed cement imparts improvement in the properties of the cement, especially compressive strength.

Thus, the methods using the polyrotaxane additives described in the present disclosure prevent explosion or cracking of cement containing entrapped gas when subjected to a negative change in pressure, and improve the resiliency against cracking of the set cement, such as a foamed cement.

The methods of the present disclosure are applicable for downhole applications including, but not limited to, those utilizing settable material with an entrapped gas phase, settable loss circulation materials with in-situ gas generated, settable loss circulation materials with gas phase added ex-situ, settable primary cementitious fluid with in-situ gas generated, and settable primary cementitious fluid with ex-situ gas generated, such as foamed cement.

EXAMPLES

Example 1—Synthesis of Polyrotaxanes

A series of polyrotaxanes were prepared from linear polymers that included polyethylene glycol (PEG), polypropylene glycol (PPG), block copolymers of PEG and PPG, and polysiloxanes (PS) that were terminated with one or more of an amine, carboxylate, azide, isocyanate, carbonyl chloride, halide, and thiol; and ring components that included α-cyclodextrin (α-CD), β-cyclodextrin (β-CD), and γ-cyclodextrin (γ-CD).

Inclusion Complexes

Exemplary polyrotaxane inclusion complexes were prepared as follows.

10 grams (g) of ($NH_2$-PS-$NH_2$, MW=25000) and 30.0 g of γ-cyclodextrin (γ-CD) were dissolved in 100 milliliters (mL) deionized water and stirred at room temperature for 12 hours (h). The polyrotaxane formed as a white precipitate, which was filtered and dried at 80° C. under vacuum or freeze-dried, to obtain a white powder, designated as γ-CD-PS-$NH_2$. The β-CD-PPG-$NH_2$ and α-CD-PEG-$NH_2$ were obtained following similar method. The $NH_2$-PPG-$NH_2$ and β-CD were employed for generating β-CD-PPG-$NH_2$. The $NH_2$L-PEG-$NH_2$ and α-CD were employed for generating α-CD-PEG-$NH_2$.

9.0 g of carboxylate terminated polyethylene glycol (HOOC-PEG-COOH, MW=20000) and 36.0 g of α-cyclodextrin (α-CD) were dissolved in 100 mL deionized water and kept refrigerated for 24 h. The polyrotaxane inclusion complex formed as a white paste which was dried at room temperature under vacuum or freeze-dried, to obtain a white powder, designated as inclusion complex A.

Similar methods were employed to obtain polyrotaxane inclusion complexes of carboxylate-terminated polypropylene glycol (HOOC-PPG-COOH) and carboxylate-terminated polysiloxanes (HOOC-PS-COOH) with β-cyclodextrin (β-CD) and γ-cyclodextrin (γ-CD), respectively.

End-Capped Inclusion Complexes

The dried inclusion complex A (10 g) was mixed with adamantanamine (0.13 g), (benzotriazol-1-yloxy)tris(dimethylamino)phosphonium hexafluorophosphate (0.4 g), and ethyldiisopropylamine (0.12) dissolved in 80 mL dimethylformamide. The mixture was reacted at 2-5° C. for 24 h. The dispersion was filtered or centrifuged and washed with a mixture of dimethylformamide/methanol 2-3 times. The precipitates were dissolved in dimethylsulfoxide and precipitated by adding deionized water. The precipitates were filtered/centrifuged and dried at room temperature under vacuum or freeze dried, to obtain polyrotaxane A.

Functionalized Polyrotaxanes 3.5 g of polyrotaxane A was dissolved in 1 N aqueous NaOH (350 mL) at 0-5° C. Propylene oxide (26.8 g) was added drop-wise, and the mixture stirred overnight from 0-5° C. to room temperature with the melting of ice in the bath. The functionalized polyrotaxane was dialyzed against deionized water for 3 days. The water was evaporated or the solution was freeze-dried under vacuum to obtain functionalized polyrotaxane A.

Sliding-Ring Polymer Synthesis 9.5 g of polyacrylic acid (MW=450,000) was dissolved in 190 mL dimethyl sulfoxide. 0.12 g of 1,1'-carbonyldiimidazole dissolved in 5 mL dimethylsulfoxide was then added to the solution and the mixture was stirred at 50° C. for 12-15 h under an inert atmosphere. The reaction mixture was cooled to room temperature. A solution of functionalized polyrotaxane A (0.5 g in 5 mL dimethylsulfoxide) was added over 30 min under an inert atmosphere with stirring. After stirring for 30 min at room temperature, the reaction mixture was heated to 65-70° C. for 72 h. The sliding-ring polymer was precipitated from tetrahydrofuran and filtered. The polymer was dried at room temperature under vacuum or freeze-dried, to obtain sliding-ring polymer A.

Figure 7:
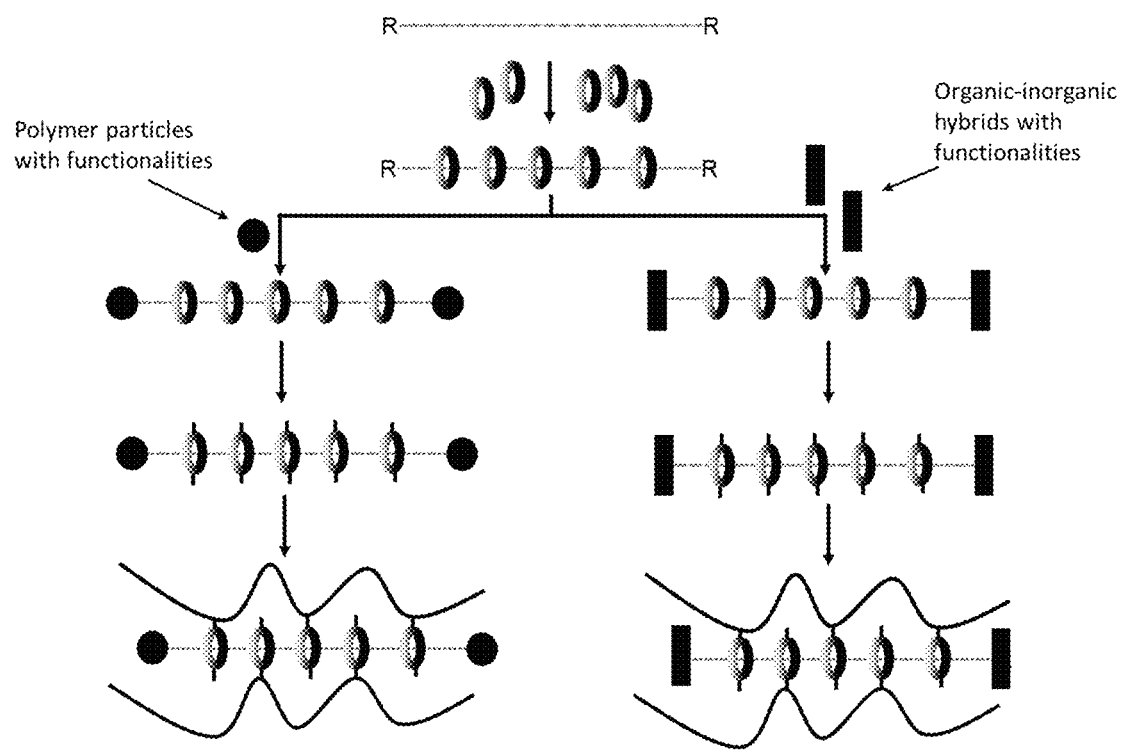
FIG. 7 illustrates the synthesis of a polyrotaxane/sliding-ring polymer using functionalized, nanoscale polymer particles or functionalized organic-inorganic hybrids as end-capping agents.

Cross-Linked Polyrotaxanes 20 g of γ-CD-PS-$NH_2$ was dispersed in acetonitrile (250 mL) and triethylamine (10 mL) was added. A solution of cyanuric chloride (CC; 2 g in 20 mL acetonitrile) was added to the above mixture at room temperature with stirring. The reaction mixture was refluxed for 8 hours and the precipitates were filtered and dried at 80° C. to obtain the cross-linked polyrotaxane γ-CD-PS-NH-CC (FIG. 5). The cyanuric chloride reacted with the amine terminal groups as well as the hydroxyl groups of the cyclodextrin, which resulted in cross-linking through cyanuric chloride to form γ-CD-PS-NH-CC cross-linked polyrotaxane designated PR-1. β-CD-PPG-NH-CC and β-CD-PEG-NH-CC were obtained from β-CD-PPG-$NH_2$ and α-CD-PEG-$NH_2$, respectively following same procedure Example 2—Polyrotaxanes End-Capped with Polymers and Organic-Inorganic Hybrids Polyrotaxanes end-capped with polymers or organic-inorganic hybrids are prepared as follows. Inclusion complex formation is conducted as described for syntheses of inclusion complexes. Polymers or inorganic particles or layered organic-inorganic hybrids (of nanoscale dimension) with functionalities such as carboxylate, amine, azide, isocyanate, carbonyl chloride, halide, and thiol, are employed as capping agent by following the procedure described for end-group capping of complex A or polyrotaxane syntheses. The step involving the anchoring of polyrotaxanes onto the high molecular weight polymers is also the same as described to generate sliding-ring polymers (FIG. 7).

Example 3—Application of Cross-Linked Polyrotaxanes in Cement

A cement composition containing a slurry containing a polyrotaxane was prepared. The slurries containing the polyrotaxanes PR-1 (Slurry A) or Sliding-ring Polymer A (Slurry B) were prepared as shown in Table 1. Each slurry contained water, a retarder (sodium hexametaphosphate (SHMP)), magnesium chloride hexahydrate, a viscosifier (xanthan), a $N_2$ gas-generating agent (azodicarboxamide), and the cross-linked polyrotaxane PR-1 (γ-CD-PS-NH-CC) prepared according to Example 1 or Sliding-ring Polymer A prepared according to Example 1.

TABLE 1

| | Slurry A | | Slurry B | |
|---|---|---|---|---|
| Material | Amount (g) | Range (by weight of cement) | Amount (g) | Range (by weight of cement) |
| Water | 60.4 | 100% | 60.4 | 100% |
| SHMP (2% by weight of MgO) | 0.84 | 01.-6% | 0.84 | 01.-6% |
| MgCl$_2$, 6 H$_2$O | 35.71 | 40-70% | 35.71 | 40-70% |
| Xanthan | 0.7 | 0.2-2% | 0.7 | 0.2-2% |
| Azodicarboxamide | 1.71 | 0.5-4% | 1.71 | 0.5-4% |
| PR-1 | 5 | 0.5-10% | — | 0% |
| Sliding-ring Polymer A | — | 0% | 5 | 0.5-10% |

Slurry A was prepared by blending 60.4 g water and 0.84 g SHMP, mixing for 2 min at 2000 RPM, adding 35.7 g MgCl$_2$ and mixing for 5 min at 2000 RPM, adding 0.7 g xanthan and mixing for 5 min at 2000 RPM, adding 1.71 g azocarboxamide and mixing for 2 min at 2000 RPM, then adding 5 g PR-1. The pH of the slurry was about 3.5 or lower.

Slurry B was prepared by blending 60.4 g water and 0.84 g SHMP, mixing for 2 min at 2000 RPM, adding 35.7 g MgC12 and mixing for 5 min at 2000 RPM, adding 0.7 g xanthan and mixing for 5 min at 2000 RPM, adding 1.71 g azocarboxamide and mixing for 2 min at 2000 RPM, then adding 5 g Sliding-ring polymer A. The pH of the slurry was about 3.5 or lower.

A cement composition containing the slurry was prepared as shown in Table 2. The cement composition contained Slurry A, magnesium oxide, and a foaming agent (PETROSTEP™ SB).

TABLE 2

| Cement composition | | |
|---|---|---|
| Material | Amount | Range (by weight of cement) |
| Slurry A | 15 cc | 100% |
| MgO | 6.4 g | 20-40% |
| PETROSTEP ™ SB | 0.3 cc | 0.5-4% |

The volume expansion of the cement composition shown in Table 2 was measured at 120° F. and 140° F. (using a water bath). The results are shown in Table 3.

TABLE 3

| Volume expansion | | |
|---|---|---|
| | 120° F. | 140° F. |
| Volume expansion (%) | 206% | 266%* |

*Actual expansion may have exceeded 266% (volume expansion stopped due to tube being capped).

The total volume as a function of time in the same cement composition but did not include the polyrotaxane was also measured at 120° F. (Table 4) and 140° F. (Table 5).

TABLE 4

| Total volume at 120° F. as a function of time in cement composition without polyrotaxane | |
|---|---|
| Time (min) | Volume (cc) |
| 0 | 15 |
| 40 | 20 |
| 164 | 30 |
| 245 | 36 |
| 310 | 39 |
| 450 | 42 |
| 1200 | 46 |

TABLE 5

| Total volume at 140° F. as a function of time in cement composition without polyrotaxane | |
|---|---|
| Time (min) | Volume (cc) |
| 0 | 15 |
| 20 | 21 |
| 32 | 29 |
| 40 | 34 |
| 55 | 38 |
| 70 | 45 |
| 85 | 55* |

*Actual expansion may have exceeded 55% (volume expansion stopped due to tube being capped).

Figures 8, 9:
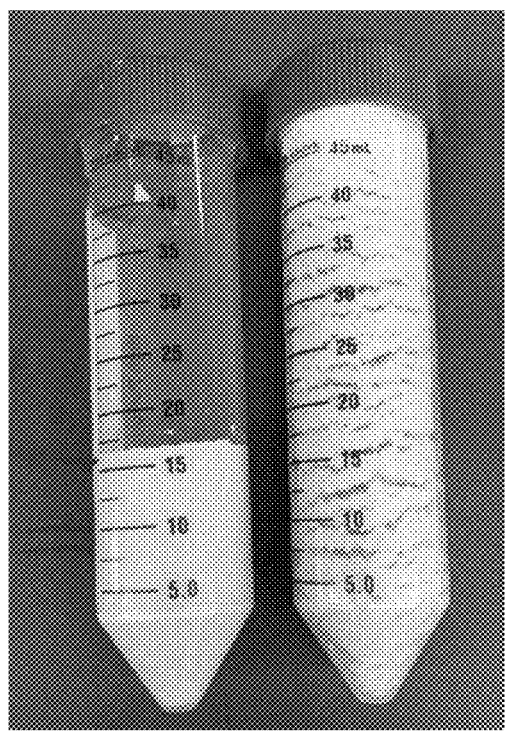
FIG. 8 shows a cement containing a gas-generating agent (right) and the same cement but without a gas-generating agent (left). The volume of the cement containing the gas-generating agent expanded by about 300%.
FIG. 9 shows a cement containing a gas-generating agent and polyrotaxane (right) and the same cement but without a polyrotaxane (left). The black lines indicate the volume of the cement compositions prior to gas generation. After gas generation, the cement composition containing the polyrotaxane (right) did not shatter while the cement composition that does not contain polyrotaxane (left) shattered.

The gas-generating agent caused the volume of each of the cement compositions to expand in volume by about 300%. FIG. 8 shows a comparison of a cement composition that did not contain a gas-generating agent (left) and the cement composition containing the gas-generating agent (right). As can be seen, the volume expanded by about 300%; however, due to tremendous explosive pressure developed by the gas phase, the set cement that contained the gas-generating agent shattered.

Addition of the polyrotaxane PR-1 to the cement containing the gas-generating agent allowed for volume expansion, but the cement did not shatter. FIG. 9 shows that the cement that contained the gas-generating agent and the polyrotaxane PR-1 (right) expanded in volume, but did not shatter after gas generation, while the same cement that contained the gas-generating agent but did not include polyrotaxane (left) expanded in volume and shattered after gas generation.

What is claimed is:

1. A cement composition comprising:
   cement; and
   a slurry comprising:
      about 2% to about 8% by weight of the slurry a cross-linked polyrotaxane additive selected from the group consisting of γ-CD-PS-NH-CC, α-CD-PEG-NH-CC, and β-CD-PPG-NH-CC; and
   a gas-generating compound.

2. The cement composition of claim 1, wherein the PEG, PPG, or PS has a molecular weight of about 1 kilodalton (kDa) to about 50 kDa.

3. The cement composition of claim 1, wherein the gas-generating compound is a nitrogen gas-generating compound.

4. The cement composition of claim 3, wherein the nitrogen gas-generating compound is azodicarboxamide.

5. The cement composition of claim 1, wherein the cement is selected from the group consisting of Portland cement, pozzolanic cement, Sorel cements, high alumina cements, and a brittle settable cement.

6. The cement composition of claim 1, wherein the cement composition comprises one or more of a foaming agent, a viscosifier, and a retarder.

7. The cement composition of claim 1, wherein the cement composition further comprises water.

8. The cement composition of claim 1, wherein the cement composition exhibits improved resiliency against cracking as compared to the same cement composition without the polyrotaxane additive.

9. The cement composition of claim 1, wherein the PEG, PPG, or PS has a molecular weight of about 5 kDa to about 40 kDa.

10. The cement composition of claim 1, wherein the PEG, PPG, or PS has a molecular weight of about 20 kDa to about 30 kDa.

11. The cement composition of claim 1, wherein the amount of the cross-linked polyrotaxane additive in the slurry is between about 4% to about 6% by weight of the slurry.

12. A method of preparing a foamed cement composition, comprising:

preparing a slurry comprising a gas-generating compound and about 2% to about 8% by weight of the slurry a cross-linked polyrotaxane additive selected from the group consisting of γ-CD-PS-NH-CC, α-CD-PEG-NH-CC, and β-CD-PPG-NH-CC; and mixing the slurry with cement and a foaming agent.

13. A method for preventing cracking in cement with entrapped gas of an oil well when the gas is subjected to a negative change in pressure, the method comprising:

providing to the oil well a cement composition comprising cement and a slurry comprising a gas-generating compound and about 2% to about 8% by weight of the slurry a cross-linked polyrotaxane additive selected from the group consisting of γ-CD-PS-NH-CC, α-CD-PEG-NH-CC, and β-CD-PPG-NH-CC.

14. A method of improving the resiliency of a foamed cement composition to cracking, comprising adding a slurry comprising a gas-generating compound and about 2% to about 8% by weight of the slurry a cross-linked polyrotaxane additive selected from the group consisting of γ-CD-PS-NH-CC, α-CD-PEG-NH-CC, and β-CD-PPG-NH-CC to a cement composition, wherein the resiliency of the foamed cement composition to cracking is greater than the resiliency of the same cement composition to cracking without the polyrotaxane additive.

* * * * *